United States Patent

Komiyama et al.

(10) Patent No.: US 6,889,126 B2
(45) Date of Patent: May 3, 2005

(54) DRIVE FORCE CONTROL FOR HYBRID ELECTRIC VEHICLE

(75) Inventors: Susumu Komiyama, Yokohama (JP); Hiroshi Iwano, Yokosuka (JP); Hideaki Inoue, Yokohama (JP); Ichiro Yamaguchi, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/825,117

(22) Filed: Apr. 16, 2004

(65) Prior Publication Data

US 2004/0254695 A1 Dec. 16, 2004

(30) Foreign Application Priority Data

Apr. 22, 2003 (JP) ........................................ 2003-116717

(51) Int. Cl.$^7$ ................................................. G06F 7/00
(52) U.S. Cl. ........................ 701/22; 701/101; 180/65.2; 180/65.4; 180/65.8; 477/3
(58) Field of Search ........................... 701/1, 22, 101; 477/2, 3; 180/65.1–65.8; 318/139, 140

(56) References Cited

U.S. PATENT DOCUMENTS 6,123,642 A * 9/2000 Saito et al. .................... 477/3
6,330,498 B2 * 12/2001 Tamagawa et al. ............ 701/22
6,366,838 B1 * 4/2002 Yoshino et al. ............... 701/22
6,554,088 B2 * 4/2003 Severinsky et al. ........ 180/65.2
6,591,173 B2 * 7/2003 Nada ............................ 701/29

FOREIGN PATENT DOCUMENTS

JP    2001-292501 A    10/2001

* cited by examiner

Primary Examiner—Richard M. Camby
(74) Attorney, Agent, or Firm—Foley & Lardner LLP (57) ABSTRACT

A hybrid electric vehicle comprises a first motor (2) connected to an internal combustion engine (1), a second motor (3) generating vehicle drive force, and a power storage device (6). A controller (9) supplies power from the power storage device (6) to the second motor (3) in response to an accelerator pedal depression amount (B16, B42). The controller (9) calculates an available power supply to the first motor (2) by subtracting the power supply to the second motor (3) from the available power of the power storage device (6) (B28). When the target rotation speed of the engine (1) exceeds the actual rotation speed of the engine (1), power from the power storage device (6) is supplied to the first motor (2) in a range which does not exceed the available power supply (B23, B32), thereby accelerating engine rotation without decreasing power supply to the second motor (3).

10 Claims, 8 Drawing Sheets

DRIVE FORCE CONTROL FOR HYBRID ELECTRIC VEHICLE

FIELD OF THE INVENTION

This invention relates to drive force control for a hybrid electric vehicle comprising an internal combustion engine and a drive motor.

BACKGROUND OF THE INVENTION

A hybrid electric vehicle comprises a generator driven by an internal combustion engine and an electric motor driving the vehicle using electrical power generated by the generator. In order to reduce the capacity of a battery of such a vehicle, it is preferred to control the engine output so that power consumed by the electric motor equals the power generated by the generator.

When the vehicle accelerates, a portion of the engine output is used in order to increase the rotation speed of the generator and the engine itself. A time lag results which corresponds to the period from the production of the increase command for the engine output to the time at which the generator reaches a rotation speed which can supply the electrical power required for driving the electrical motor. Such a time lag may be reduced by supplying power from the battery to the generator in order to increase the rotation speed of the engine and the generator. At the same time, power is supplied from the battery to the electric motor to accelerate the vehicle running until the generator reaches a rotation speed at which the required power may be supplied. According to such an operation, however, since power is supplied from the battery to the generator, a reduction in the level of power supply from the battery to the electric motor can not be avoided.

Thus even when battery power is supplied to the generator in order to shorten the time lag, this does not necessarily improve acceleration performance of the vehicle.

JP2001-292501A published by the Japan Patent Office in 2001 discloses a method of limiting the output of the electric motor when power generation by the generator falls below the required power generation amount in order to limit consumption of battery power during vehicle acceleration.

SUMMARY OF THE INVENTION

However when the output of the electric motor is limited, the rate of increase in the rotation speed of the electric motor, in other words, vehicle acceleration can only be performed gradually. As a result, even when battery power consumption is suppressed, deterioration of vehicle acceleration characteristics may result.

It is therefore an object of this invention to optimize the acceleration performance of a hybrid electric vehicle while using a limited battery capacity.

In order to achieve the above object, this invention provides a hybrid electric vehicle comprising an accelerator pedal, an engine consuming fuel in order to output a rotating torque, a first motor connected to the engine, a second motor generating a drive torque for the vehicle in response to power supply, and a power storage device connected electrically with the first motor and the second motor.

The first motor generates electric power in response to the rotating torque of the engine while generating a rotating torque to accelerate the engine in response to power supply. The power storage device supplies power to the first motor and the second motor while accumulating power generated by the first motor.

In order to control the drive force for the hybrid electric vehicle, the vehicle further comprises a sensor detecting a depression amount of the accelerator pedal, a sensor detecting a rotation speed of the engine, and a programmable controller.

The controller is programmed to set a target drive torque for the vehicle in response to the depression amount of the accelerator pedal, supply power corresponding to the target drive torque to the second motor from the power storage device, calculate an available power supply amount to the first motor by subtracting a power supply amount to the second motor from an available output power of the power storage device, calculate a target rotation speed of the engine based on the target drive torque, and supply power to the first motor from the power storage device within a range which does not exceed the available power supply amount to the first motor, when the available power supply amount to the first motor is a positive value and the target rotation speed of the engine exceeds the rotation speed of the engine.

This invention also provides a control method for the above hybrid electric vehicle. The method comprises determining a depression amount of the accelerator pedal, determining a rotation speed of the engine, setting a target drive torque for the vehicle in response to the depression amount of the accelerator pedal, supplying power corresponding to the target drive torque to the second motor from the power storage device, calculating an available power supply amount to the first motor by subtracting a power supply amount to the second motor from an available output power of the power storage device, calculating a target rotation speed of the engine based on the target drive torque, and supplying power to the first motor from the power storage device within a range which does not exceed the available power supply amount to the first motor, when the available power supply amount to the first motor is a positive value and the target rotation speed of the engine exceeds the rotation speed of the engine.

The details as well as other features and advantages of this invention are set forth in the remainder of the specification and are shown in the accompanying drawings.

DESCRIPTION OF THE PREFERRED EMBODIMENTS

Figure 1:
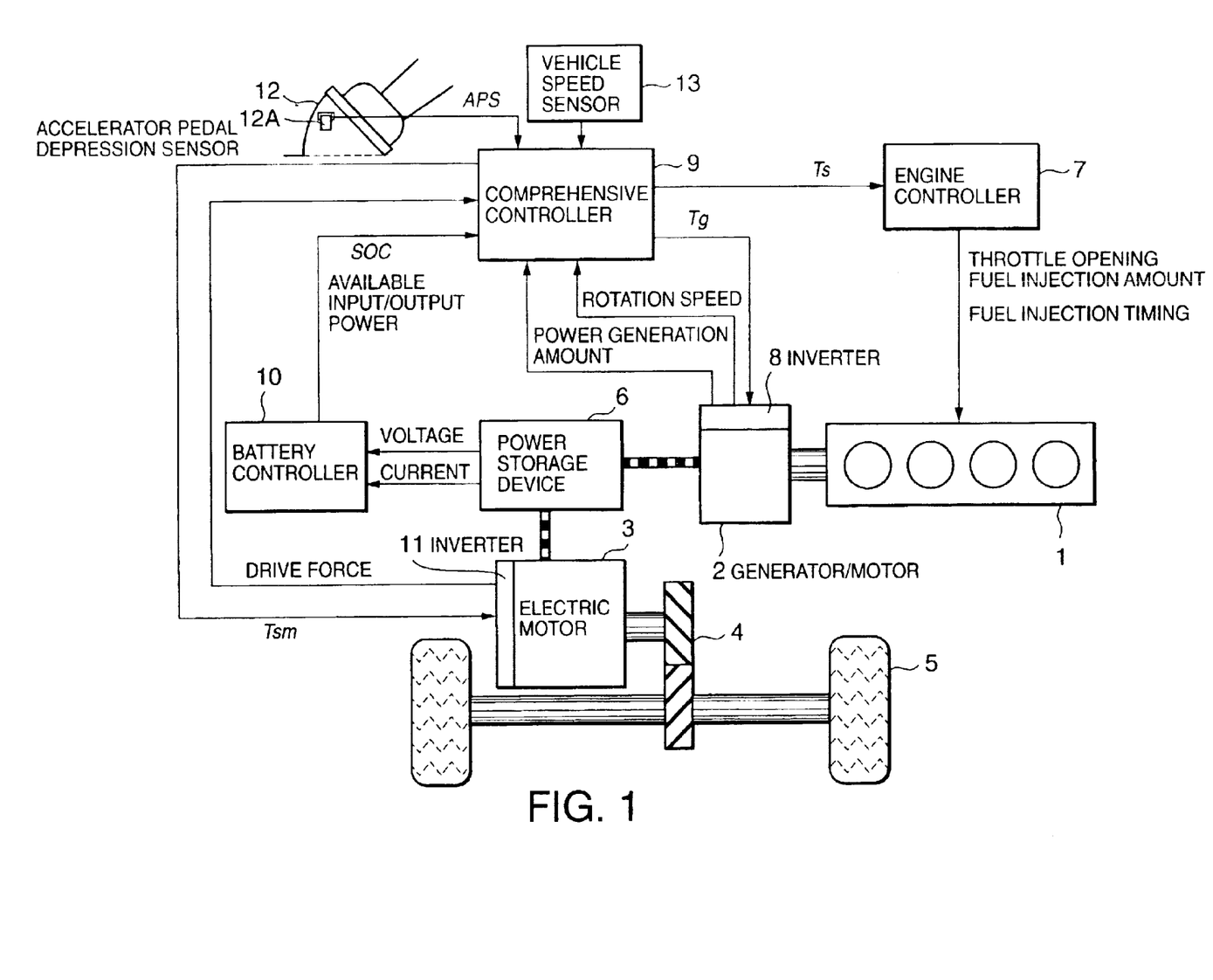
FIG. 1 is a schematic diagram of a control device of a series hybrid electric vehicle according to a first embodiment of this invention.

Referring to FIG. 1 of the drawings, a series hybrid electric vehicle is provided with a power train comprising an internal combustion engine 1, an alternating current (A/C) generator/motor 2 directly connected to the internal combustion engine 1, an A/C electric motor 3 rotating drive wheels 5 using the electric power generated by the generator/motor 2, and a power storage device 6 interposed in the electric circuit connecting the electric motor with the generator/motor 2.

The generator/motor 2 corresponds to the first motor in the Claims, and the electric motor 3 corresponds to the second motor in the Claims.

The power storage device 6 comprises converter/inverter equipment converting direct current and alternating current to reach other.

The electric motor 3 is connected to the drive wheels 5 through a final gear 4. The electric motor 3 may also comprise a motor having a generator function allowing regeneration of rotational energy from the drive wheels 5 during vehicle deceleration.

In order to control the power train, a control device comprises a comprehensive controller 9, an inverter 11 a battery controller 10, an inverter 8, and an engine controller 7.

The controllers 7, 9, 10 each comprises a microcomputer provided with a central processing unit (CPU), a read-only memory (ROM), a random access memory (RAM) and an input/output interface (I/O interface).

Each of these controllers 7, 9, 10 may comprise a plurality of microcomputers. Conversely these controllers may be constituted by a single microcomputer.

The output torque of the internal combustion engine 1 is regulated by an opening of a throttle, fuel injection amount and fuel injection timing.

The engine controller 7 regulates these parameters in response to an engine torque command value output by the comprehensive controller 9.

Since the generator/motor 2 is directly connected to the internal combustion engine 1, the rotation speed of the generator/motor 2 has a fixed relation with the rotation speed of the internal combustion engine 1. The inverter 8 regulates the torque of the generator/motor 2 using vector control based on command signals from the comprehensive controller 9.

The inverter 8 has the further function of detecting the actual power generation amount and the actual rotation speed of the generator/motor 2 and inputting a corresponding signal to the comprehensive controller 9.

The comprehensive controller 9 calculates a torque command value for the generator/motor 2 so that the rotation speed of the generator/motor 2 coincides with a target rotation speed. The comprehensive controller 9 outputs a corresponding signal to the inverter 8. The inverter 8 controls the rotation speed of the generator/motor 2 to the target rotation speed by controlling the power generation of the generator/motor 2, in other words, the rotation resistance, based on the torque command value.

The battery controller 10 calculates a battery state of charge (SOC), an available input power and an available output power based on the charge/discharge voltage and current of the battery in the power storage device 6. A signal corresponding to this calculation result is input to the comprehensive controller 9.

The inverter 11 regulates the output torque of the electric motor 3 using vector control based on motor torque control values output by the comprehensive controller 9. The inverter 11 detects the actual drive force of the electric motor 3 and inputs a corresponding signal to the comprehensive controller 9.

The control device further comprises an accelerator pedal depression sensor 12A which detects a depression amount APS of an accelerator pedal 12 provided in the vehicle and a vehicle speed sensor 13 which detects a vehicle speed. The detected data from these sensors are input as signals to the comprehensive controller 9.

Control routines executed by the comprehensive controller 9 based on the above arrangement for drive torque of the electric motor 3, the power generation torque of the generator/motor 2 and the output torque of the internal combustion engine 1 will be described hereafter. This routine is executed at an interval of ten milliseconds when the vehicle power switch is ON.

Firstly the control routine will be outlined.

When the vehicle is accelerated by depressing the accelerator pedal 12, a command to increase the output of the engine 1 is generated. There is a time lag from the command until the rotation of the generator/motor 2 connected to the engine 1 actually increases. This is due to the fact that a portion of the engine output is consumed in increasing the rotation of the generator/motor 2 and the engine 1 against inertial resistance.

If the generator/motor 2 is operated as an electric motor, the rotation of the engine 1 and the generator/motor 2 is accelerated. Consequently the rotation speed of the engine 1, in other words the power generation of the generator/motor 2 is increased rapidly. However there is a limit in the storage capacity of the power storage device 6. If the power supply amount to the electric motor 3 decreases as a result of supplying power to the generator/motor 2, it may adversely affect the acceleration performance of the vehicle.

The comprehensive controller 9 controls the operation of the engine 1, the generator/motor 2 and the electric motor 3 in response to the power supply performance of the power storage device 6 in order to optimize the acceleration performance of the vehicle. The comprehensive controller 9 sets a target rotation speed for the generator/motor 2 in response to the vehicle speed and the accelerator pedal depression amount APS. When there is a margin in the power supply performance of the power storage device 6, power is supplied to the generator/motor 2 in response to the difference between the target rotation speed and the actual rotation speed.

Figure 2:
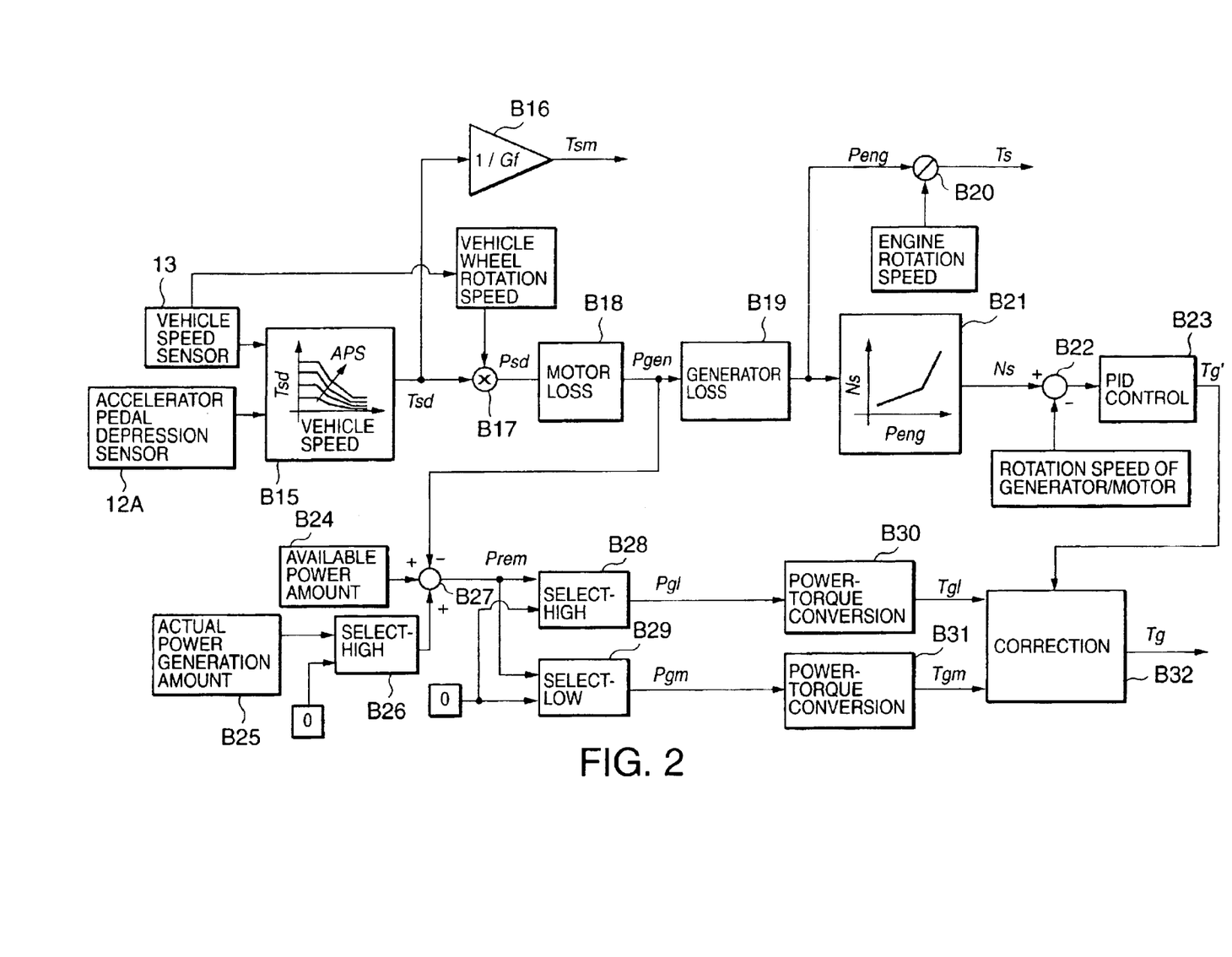
FIG. 2 is a block diagram showing the control function of a comprehensive controller according to the first embodiment of this invention.

Referring to FIG. 2, this control will be described in detail below.

It should be noted that blocks shown in the figure are virtual units for the purpose of describing the functions of the comprehensive controller 9 and do not exist as physical entities.

Firstly in a block B15, the comprehensive controller 9 uses the vehicle speed detected by the vehicle speed sensor 13 and the accelerator pedal depression amount APS detected by the accelerator pedal depression sensor 12A in order to set a target axle drive torque Tsd by looking up a map of vehicle axle torque pre-stored in the ROM. The map gives a larger target axle drive torque Tsd as the accelerator pedal depression amount APS increases, and gives a larger target axle drive torque Tsd when the vehicle speed is smaller.

In a block B16, the comprehensive controller 9 calculates an output torque command value Tsm for the electric motor 3 by dividing the target axle drive torque Tsd by the deceleration ratio Gf of the final gear 4. The comprehensive controller 9 performs vector control on the output torque of the electric motor 3 by outputting the output torque command value Tsm to the inverter 11.

On the other hand, in a block B17, the comprehensive controller 9 calculates a target drive power Psd by multiplying the vehicle wheel rotation speed by the target axle drive torque Tsd. The vehicle wheel rotation speed is obtained by multiplying a predetermined constant by the vehicle speed.

In a block B18, the comprehensive controller 9 calculates a target power generation amount Pgen by adding the energy loss resulting from operation of the electric motor 3 to the target drive power Psd. Herein the target power generation amount Pgen is equal to a target power supply amount to the electric motor 3. The energy loss resulting from operation of the electric motor 3 varies in response to the rotation speed and the output torque of the electric motor 3. A map is provided of empirical results for the energy loss on the basis of parameters such as the rotation speed and the output torque of the electric motor 3. The map is produced beforehand and stored in the ROM of the comprehensive controller 9. In the block B18, the comprehensive controller 9 looks up the map and calculates the energy loss resulting from the operation of the electric motor 3 by using the actual rotation speed of the electric motor 3 detected by the inverter 8 and the output torque command value Tsm calculated in the block 16B.

In a block B19, the comprehensive controller 9 calculates a target engine output power Peng by adding the energy loss resulting from operating the generator/motor 2 to the target power generation amount Pgen. The energy loss resulting from the operation of the generator/motor 2 is estimated in the following manner.

A map is provided in order to produce empirical calculations of the energy loss of the generator/motor 2. This map assumes that the generator/motor 2 is operating under conditions in which the fuel consumption of the engine 1 is minimized with respect to various power generation values when power generation is performed by operating the generator/motor 2 with the engine 1. The map is pre-stored in the ROM of the comprehensive controller 9. The comprehensive controller 9 calculates the energy loss of the generator/motor 2 by looking up a map using the target power generation amount Pgen. In the alternative, the map may be produced by measuring the energy loss at respective rotation speeds and power generation amounts of the generator/motor 2.

In a block B20, the comprehensive controller 9 calculates an engine torque command value Ts by dividing the target engine output power Peng by the engine rotation speed. The engine rotation speed is equal to the rotation speed of the generator/motor 2 detected by the inverter 8. The comprehensive controller 9 outputs the engine torque command value Ts to the engine controller 7.

In a block B21, the comprehensive controller 9 calculates a target rotation speed required to achieve the target engine output power Peng at a minimum fuel consumption by look up a minimum fuel consumption map having characteristics as shown in the figure. The calculated target rotation speed for the engine 1 is output to a block B22 as a generator target rotation speed Ns.

In the block B22, the comprehensive controller 9 calculates a speed differential between the rotation speed of the generator/motor 2 detected by the inverter 8 and the generator target rotation speed Ns.

In a block B23, the comprehensive controller 9 calculates a provisional generator torque command value Tg' so that the speed differential decreases. A known Proportional/Integral/Differential (PID) control method used in feedback control is employed in the calculation of the provisional generator torque command value Tg'.

The comprehensive controller 9 reads the respective values for the available power amount of the power storage device 6 input from the battery controller 10 in a block B24 and the actual power generation amount of the generator/motor 2 input from the inverter 8 in the block B25. The comprehensive controller 9 limits the lower limit of the actual power generation amount to zero using select-high operation in a block B26.

In a block B27, the comprehensive controller 9 calculates an excess power Prem by subtracting the target power generation amount Pgen of the generator/motor 2 calculated in the block B18 from the sum of the actual power generation amount of the generator/motor 2 and the available power of the power storage device 6.

The reason that the lower limit of the actual power generation amount to zero in the block B26 is as follows.

When the generator/motor 2 is driven as an electric motor, the actual power generation amount read in the block B25 takes a negative value. This negative power generation is the motor drive force supplied to the generator/motor 2 from the power storage device 6. The available output power of the power storage device 6 read by the comprehensive controller 9 in the block B24 is a value after subtracting the drive force. In the block B27, therefore, only the power generation amount of the generator/motor 2 should be input as a positive value. Drive force when the generator/motor 2 is operated as an electric motor should not be input.

The actual generation power amount of the generator/motor 2 may either be a direct measurement of the A/C power generated by the generator/motor 2 or may be calculated by subtracting the generator loss from the summation of the rotation speed and the rotation torque of the generator/motor 2.

The comprehensive controller 9 limits the lower limit of the excess power Prem to zero using select-high control in a block B28. The value with the limit applied is taken as a generator/motor available power Pgl.

In a block B30, the comprehensive controller 9 calculates the available torque Tgl when the generator/motor 2 is driven as an electric motor by dividing the available power Pgl of the generator/motor 2 by the actual rotation speed of the generator/motor 2 input from the inverter 8.

The available power Pgk and the available torque Tgl of the generator/motor 2 corresponds to the power which is available to drive the generator/motor 2 as an electric motor and the resulting output torque. When the generator/motor 2 is driven in this range as an electric motor, it is possible to increase the rotation speed of the engine 1 and the generator/motor 2 without exceeding the available power of the power storage device 6.

In a block B29, the comprehensive controller 9 limits the upper limit of the excess power Prem to zero using select-low operation. The absolute value when the limit is applied is taken as the required power generation amount Pgm when the generator/motor 2 is operated as a generator.

The comprehensive controller 9 calculates the required generated torque Tgm of the generator/motor 2 by dividing the required power generation amount Pgm by the actual rotation speed of the generator/motor 2.

The required power generation amount Pgm and the required generated torque Tgm of the generator/motor 2 express the shortfall of the available power supply at the present time and the corresponding torque conversion value. This corresponds to the required power for realizing the target axle drive torque Tsd.

When the available power Pgl of the generator/motor 2 is a value other than zero due to the algorithm in the process of the block B28 and B29, the required power generation amount Pgm of the generator/motor 2 takes a value of zero. When the required power generation amount Pgm of the generator/motor 2 is a value other than zero, the available power Pgl of the generator/motor 2 takes a value of zero.

In a block B32, the comprehensive controller 9 calculates a generated torque command value Tg of the generator/motor 2 by correcting the provisional generator torque command value Tg' by the method below based on the available torque Tgl and the required generated torque Tgm.

Firstly when the available torque Tgl is a value other than zero, the available torque Tgl is taken as the generated torque command value Tg of the generator/motor 2. Power from the power storage device 6 is supplied to the generator/motor 2. As a result, the generator/motor 2 functions as a motor and transmits generated torque to the engine 1.

When the available torque Tgl is zero, the larger value of the provisional generator torque command value Tg' and the required generated torque Tgm is taken as the generated torque command value Tg of the generator/motor 2. The generated torque command value Tg of the generator/motor 2 is output as a negative value. The generator/motor 2 generates power using input torque from the engine 1 which operates as a generator.

When the drive torque command value Tg is a positive value, the inverter 8 supplies power corresponding to the drive torque command value Tg to the generator/motor 2 and the generator/motor 2 is driven as an electric motor. When the drive torque command value Tg is negative, the inverter 8 regulates the rotation resistance of the generator/motor 2 so that generator/motor 2 performs power generation operations using torque from the engine 1 which is equal to the absolute value of the drive torque command value Tg. When the drive torque command value Tg is zero, there is no shortfall in the power and therefore no correction is performed.

Firstly the control routine is adapted so that power corresponding to the output torque command value Tsm is supplied to the electric motor 3 in the block B16. The output torque of the internal combustion engine 1 is controlled by the engine torque command value Ts corresponding to the output torque command value Tsm in the block B20.

In the block B27, the excess power Prem is calculated by subtracting the target power generation amount Pgen of the generator/motor 2 from the available power of the power storage device 6 and the actual power generation amount of the generator/motor 2. The generator/motor 2 is operated either as a generator or as a motor by the inverter 8 by the drive torque command value Tg depending on whether the excess power Prem is positive or negative.

Thus when the vehicle is accelerating, in addition to the power corresponding to the target drive power supplied to the electric motor 3, excess power is supplied to the generator/motor 2 as required and used in order to accelerate the rotation of the engine 1 and the generator/motor 2. Thus the acceleration characteristics of the vehicle are optimized under given power supply conditions.

Preferably this control ensures that the required generated torque Tgm calculated in the block B31 does not exceed the output torque of the engine 1. Alternatively in the block B16, when the output torque command value Tsm of the electric motor 3 is calculated, a limit which corresponds to the available power of the power storage device 6 is applied to the amount of variation from the command value $Tsm_{n-1}$ on the immediately preceding occasion the routine was performed. Instead of the available power of the power storage device 6, it is possible to set the limit using a parameter such as the temperature of the power storage device 6 or the state of charge (SOC) of the power storage device 6. The limit on the variation amount may be a limit on the variation amount per unit time or may apply variation limiting processing using a filter on the output torque command value Tsm.

The reason for applying limit on the variation amount on the output torque command value Tsm of the electric motor 3 is as follows.

In the control routine shown in FIG. 2, the output of the output torque command value Tsm to the electric motor 3 in the block B16 is performed before output of the generated torque command value Tg of the generator/motor 2 in the block B32. As a result, when a limit is not applied to the variation amount of the output torque command value Tsm to the electric motor 3, all of the available power of the power storage device 6 is supplied to the electric motor 3 and there may be a shortfall in the power supply to the generator/motor 2.

Under these condition, the increase in the rotation speed of the engine 1 and the generator/motor 2 depends only on the output torque of the engine 1 as a result of the engine torque command value Ts and a delay tends to be produced in the increase in the rotation speed.

When the variation amount in the output torque command value Tsm is limited, it is possible to prevent a rapid increase in the power consumption of the electric motor 3 immediately after depression of the accelerator pedal 12. During this period, excess power is supplied to the generator/motor 2 and it is possible to increase the rotation speed of the engine 1 and the generator/motor 2.

Next referring to FIGS. 3–6, FIGS. 7A–7F, FIGS. 8A–8F and FIGS. 9A–9F, a second embodiment of this invention will be described. In this embodiment, this invention is applied to a parallel hybrid electric vehicle.

Figure 3:
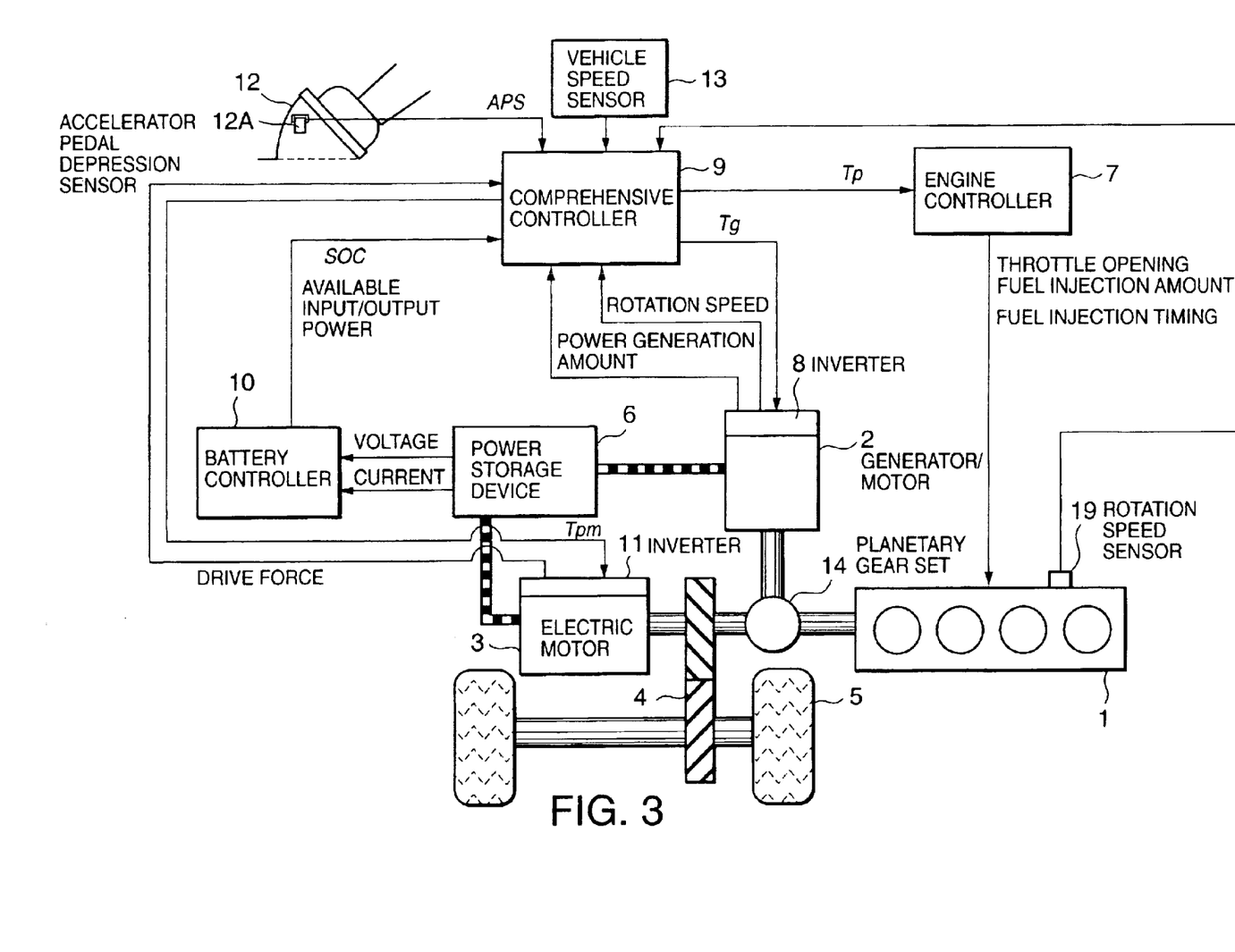
FIG. 3 is a schematic diagram of a control device for a parallel hybrid electric vehicle according to a second embodiment of this invention.

Referring to FIG. 3, the parallel hybrid electric vehicle according to this embodiment comprises a power train including an internal combustion engine 1, a generator/motor 2, and a planetary gear set 14 mechanically engaged with an electric motor 3. In addition, a rotation speed sensor 19 is provided in order to detect the rotation speed of the engine 1.

The other components of the power train are identical to those of the first embodiment.

Figure 5:
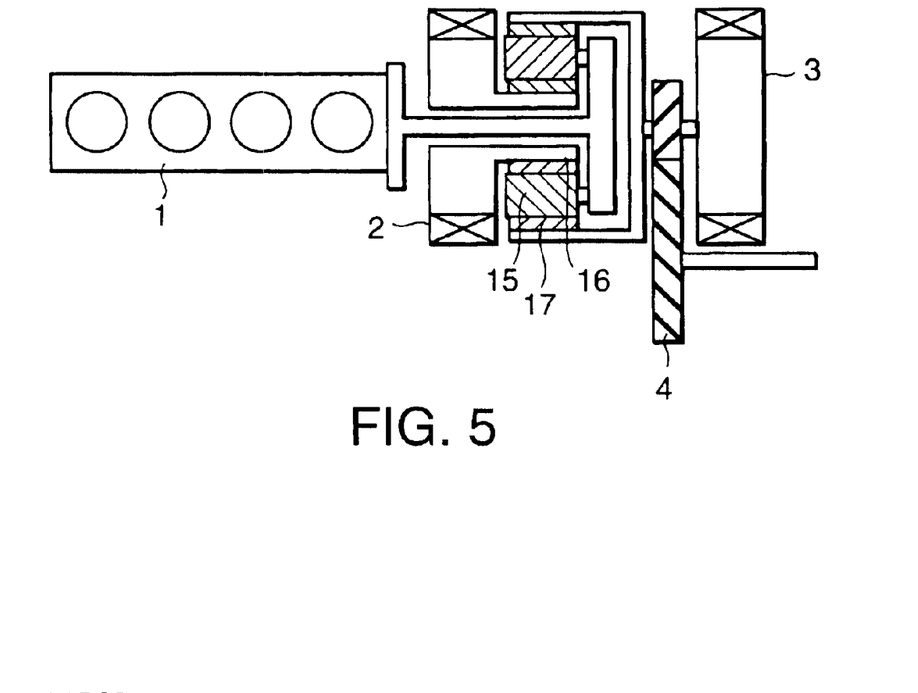
FIG. 5 is a schematic diagram of a differential mechanism used in the parallel hybrid electric vehicle.

Referring to FIG. 5, the planetary gear set 14 comprises a sun gear 16, a ring gear 17 coaxially disposed to the outer side of the sun gear 16, a plurality of planet gears 15 engaged with the sun gear 16 and the ring gear 17 and a carrier 18 supporting the planet gears 15 such that they can orbit around the sun gear 16.

The sun gear 16 is connected to the generator/motor 2. The ring gear 17 is connected to the drive wheels through a final gear 4. The carrier 18 is connected to the engine 1.

This structure allows rotation torque from the engine 1 to be transmitted to the drive wheels 5 through the ring gear 17 as well as to the generator/motor 2 through the sun gear 16.

Figure 6:
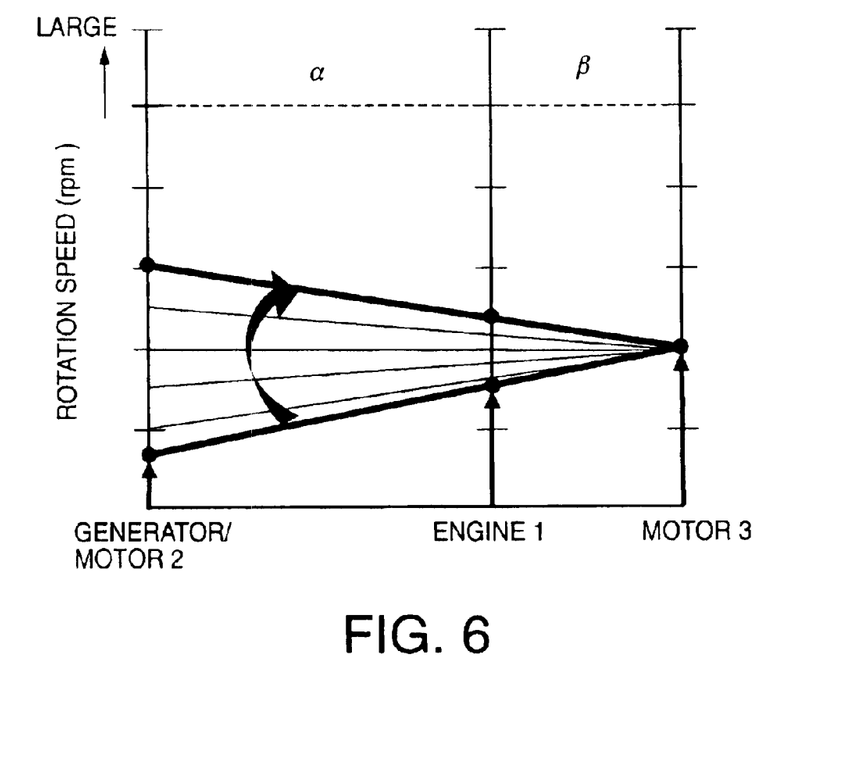
FIG. 6 is a diagram showing the relationship between rotation speed of a drive motor and an internal combustion engine and a generator/motor of the parallel hybrid electric vehicle.

The relationship of the rotation speed of the engine 1, the generator/motor 2 and the electric motor 3 with respect to the planetary gear set 14 is regulated as shown in FIG. 6. The letters $\alpha$ and $\beta$ in the figure correspond to the gear ratio $\alpha/\beta$ of the sun gear 16 and the ring gear 17. This figure shows the range and relationship of the rotation speed obtained by the engine 1 and the generator/motor 2 relative to the rotation speed of the electric motor 3. The figure shows that the rotation speed of the engine 1 is controlled by controlling the rotation speed of the generator/motor 2. In other words, the planetary gear set 14 functions as a variable mechanism which varies the ratio of the rotation speed of the engine 1 and the rotation speed of the final gear 4 in response to the rotation speed of the generator/motor 2.

Figure 4:
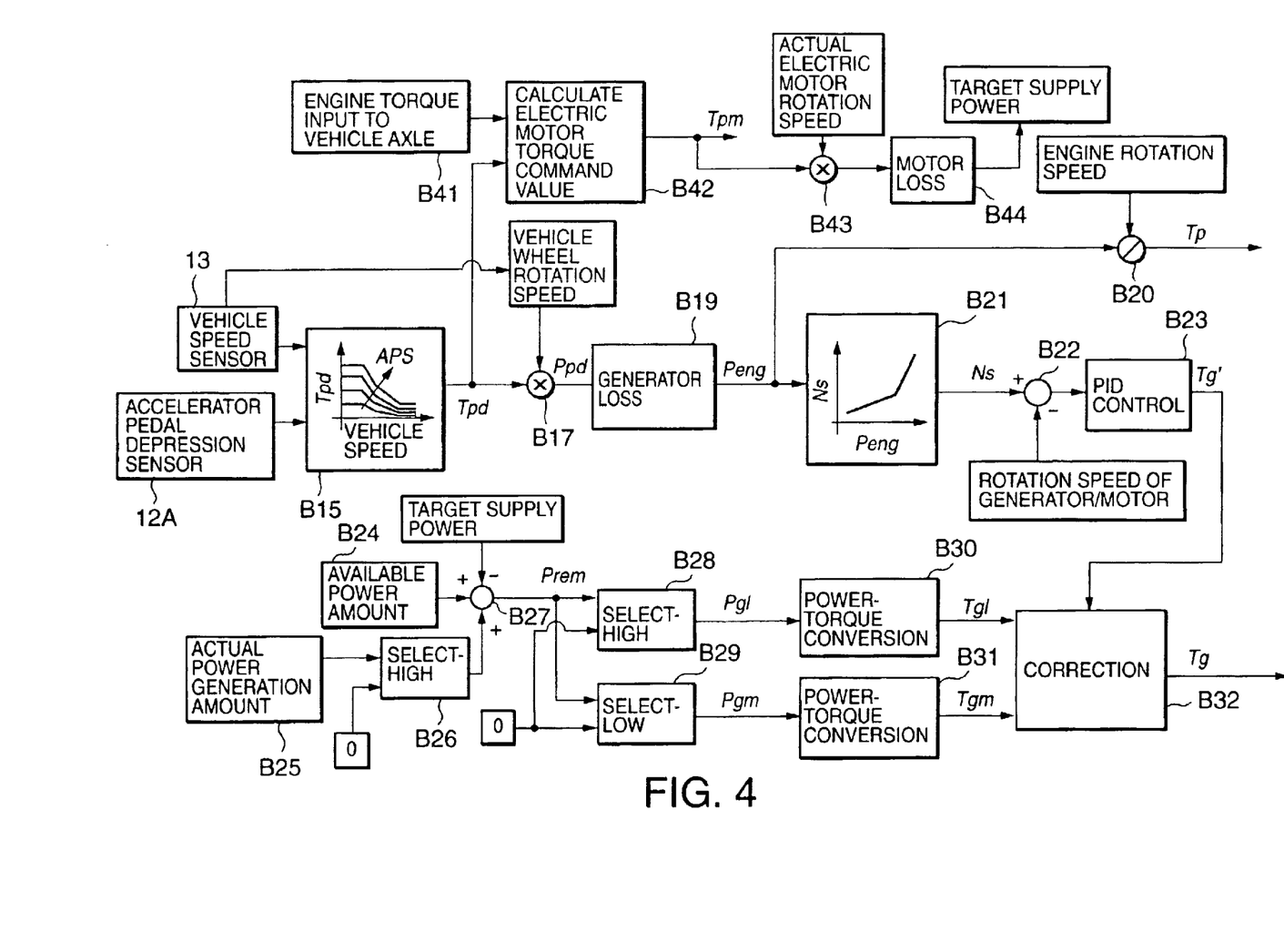
FIG. 4 is a block diagram showing the control function of a comprehensive controller according to the second embodiment of this invention.

Referring to FIG. 4, the control of the drive torque of the electric motor 3, the generated torque of the generator/motor 2 and the output torque of the engine 1 executed by the comprehensive controller 9 according to this embodiment will be described. This routine is executed at ten millisecond intervals when the power switch of the vehicle is ON and corresponds to control shown in FIG. 2 according to the first embodiment.

In this embodiment, in contrast to control according to the first embodiment in FIG. 2, blocks B16 and B18 are omitted and blocks B41–B44 are added.

The point of difference between a parallel hybrid electric vehicle and a series hybrid electric vehicle lies in the distribution of engine output power to the drive wheels 5. In the first embodiment, excess power Prem is calculated based on the target power generation amount Pgen. However in this embodiment, excess power Prem is calculated based on predicted power consumption by the electric motor 3. In the first embodiment, the entire amount of drive torque to the drive wheels 5 is supplied from the electric motor 3. However in this embodiment, since the output torque of the engine 1 is also transmitted to the drive wheels 5, the output torque required by the electric motor 3 is reduced. Thus the excess power Prem which can be supplied to the generator/motor 2 from the power storage device 6 increases.

In the block B41, the comprehensive controller 9 estimates the engine torque input to the vehicle axle. The estimation is calculated by subtracting the drive torque of the generator/motor 2 from the engine output torque. The engine output torque is calculated by applying a filter process to the engine torque command value Tp described hereafter. However the engine torque command value Tp is not a value which is calculated prospectively but is a value output as a result of executing the routine on the immediately previous or even a more remote occasion. Alternatively it is possible to detect an intake air amount of the engine 1 and to use the intake air amount in order to calculate the engine output torque. The drive torque command value Tg is used in the drive torque of the generator/motor 2. This value is a value which is output as a result of executing the routine on a previous occasion.

In the block B42, after calculating the target axle drive torque Tpd in the block B15, the comprehensive controller 9 calculates the electric motor torque command value Tpm by subtracting the estimated value for the engine torque input to the vehicle axle from the target axle drive torque Tsd and dividing the resulting value with the deceleration ratio Gf of the final gear 4. The target axle drive torque Tpd corresponds to the target axle drive torque Tsd in the first embodiment. The electric motor torque command value Tpm corresponds to the electric motor torque command value Tsm of the first embodiment. These quantities are denoted by different signs due to the fact that the map in block B15 is different from the map used in the first embodiment.

The comprehensive controller 9 performs vector control on the output torque of the electric motor 3 by outputting the output torque control value Tpm to the inverter 11.

On the other hand, in the block B43, the comprehensive controller 9 calculates a target drive power of the electric motor 3 by multiplying the actual electric motor rotation speed calculated from the vehicle speed by the electric motor torque command value Tpm.

In the block B44, the comprehensive controller 9 calculates a target supply power to the electric motor 3 by calculating the energy loss of the electric motor 3 which is the same as the block B18 in the first embodiment and then adding the energy loss to the target drive output.

The comprehensive controller 9 adds the energy loss resulting from the operation of the generator/motor 2 in the block B19 after calculating the target drive power Ppd for the vehicle in the block B17 in the same manner as the first embodiment. Consequently it is possible to calculate the target engine output power Peng. The target drive power Ppd corresponds to the target drive power Psd in the first embodiment. The process of calculating the engine torque command value Tp and the provisional generator torque command value Tg' from the target engine output power Peng is the same as the first embodiment. The engine torque command value Tp corresponds to the engine torque command value Ts of the first embodiment.

In the first embodiment, the energy loss resulting from operation of the electric motor 3 in the block B18 is added to the target drive power Psd. However in this embodiment, a portion of the engine output is input to the final gear 4 directly rather than through the electric motor 3. The energy loss resulting from the operation of the electric motor 3 is not added at this point. In the block B44, the energy loss is added when the target input power of the electric motor 3 is calculated.

The comprehensive controller 9 calculates the excess power Prem by subtracting the target supply power to the electric motor 3 calculated in the block B44 from the sum of the available power of the power storage device 6 and the actual power generation amount of the generator/motor 2 in the block B27.

The process in the block B28–B32 is the same as the first embodiment. Specifically, the available torque Tgl of the generator/motor 2 when it is operated as an electric motor, and the required generated torque Tgm of the generator/motor 2 when it is operated as a generator are calculated based on the excess power Prem. The provisional generator torque command value Tg' is corrected based on these values in order to calculate the drive torque command value Tg of the generator/motor 2.

Also according to this embodiment, in order to prevent a shortfall in the power supply to the generator/motor 2 by supplying all the available output power of the power storage device 6 to the electric motor 3 immediately after depression of the accelerator pedal 12, it is preferable to suppress rapid increase in power consumption of the electric motor 3.

When the vehicle is accelerating, the speed ratio variation in the transmission constituted by the planetary gear set 14 is accelerated by supplying power to the generator/motor 2 and driving the generator/motor 2 as an electric motor.

However when the rate of increase of the target axle drive torque Tpd calculated in the block B15 with respect to the depression of the accelerator pedal 12 is large, there remains the possibility that the torque increase of the engine 1 will not follow the variation in the speed ratio. Consequently the limit may be applied to the rate of increase in the target axle drive torque Tpd together with the limit on the rate of increase in power consumption by the electric motor 3.

Referring to FIGS. 7A–7F, FIGS. 8A–8F and FIGS. 9A–9F, the effect and operation of control according to this embodiment will be described. All of these timing charts show the results of simulations conducted by the inventors with respect to the motion characteristics of a parallel hybrid vehicle when the accelerator pedal 12 is depressed until a fully open position when the vehicle has been stopped for ten seconds. In all of the simulations, the available output power of the power storage device 6 is set to three kilowatts.

FIGS. 7A–7F show the acceleration characteristics of applying the control shown in FIG. 4. FIGS. 8A–8F show the acceleration characteristics of a parallel hybrid vehicle in FIG. 2 when the speed ratio variation of the planetary gear set 14 is set to be quick without applying the control shown in FIG. 4. FIGS. 9A–9F show the acceleration characteristics of a parallel hybrid vehicle in FIG. 2 when the speed ratio variation of the planetary gear set 14 is retarded and power supply to the generator/motor 2 is not performed.

Figure 8A:
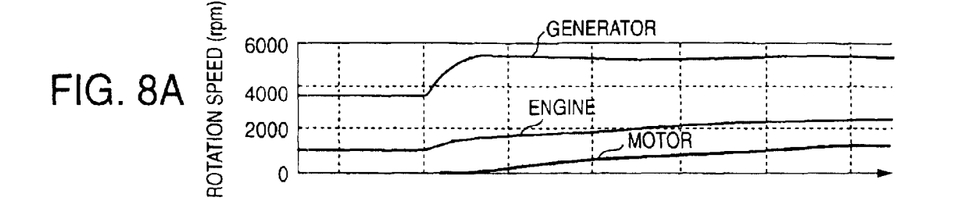
FIGS. 8A–8F are timing charts showing the acceleration performance of a parallel hybrid electric vehicle when the target increase rate of the rotation speed of the electric motor is set to a large value.
Figure 8B:
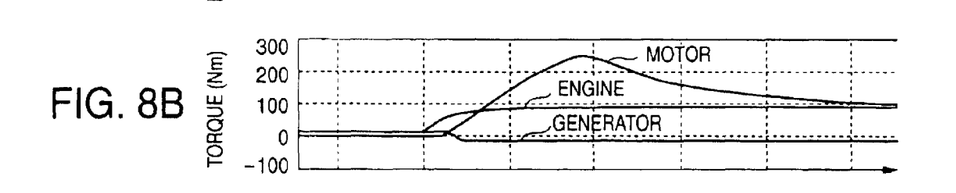
Figure 8C:
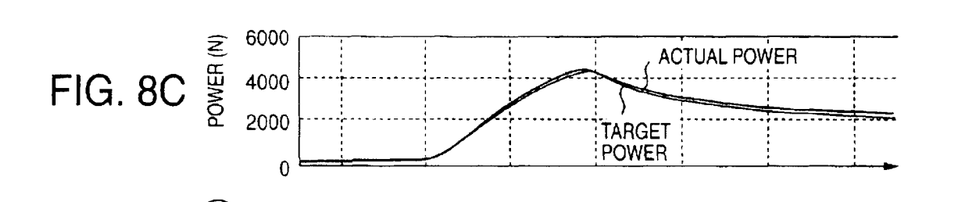
Figure 8D:
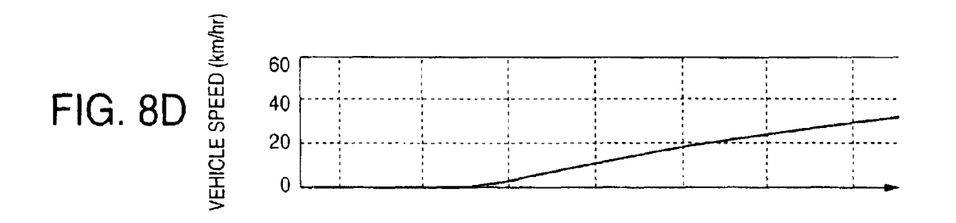
Figure 8E:
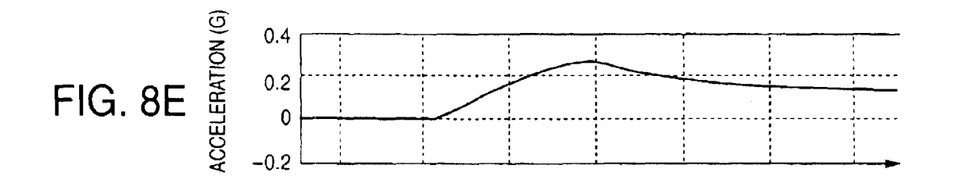
Figure 8F:
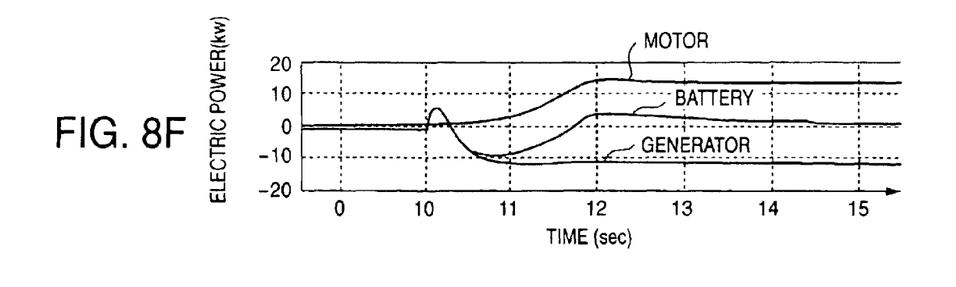
Figure 9A:
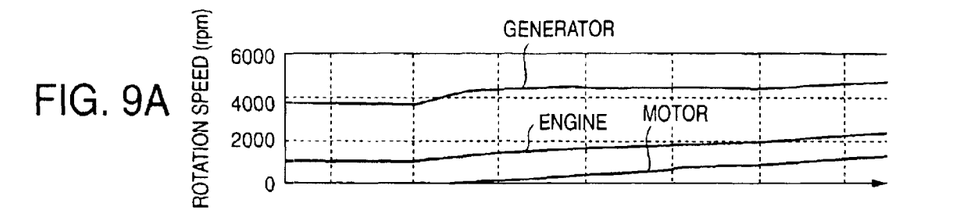
FIGS. 9A–9F are timing charts showing the acceleration performance of a parallel hybrid electric vehicle when electric power is not supplied to the generator/motor.
Figure 9B:
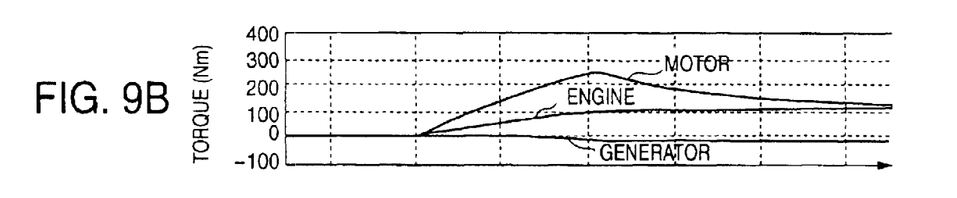
Figure 9C:
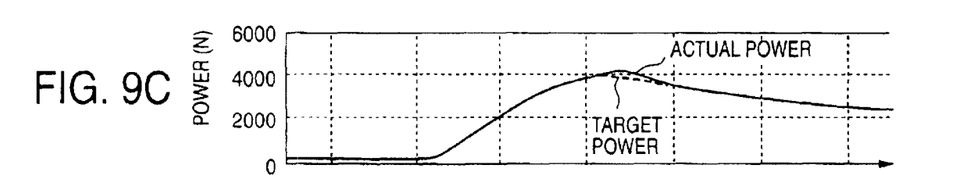
Figure 9D:
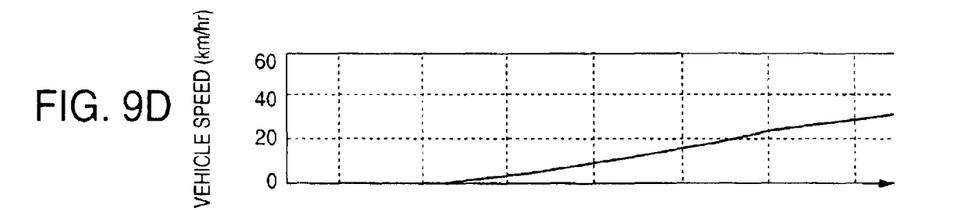
Figure 9E:
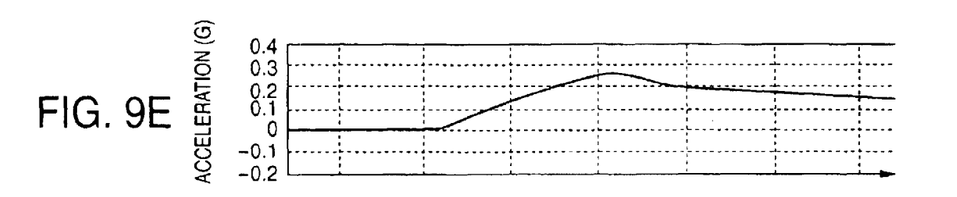
Figure 9F:
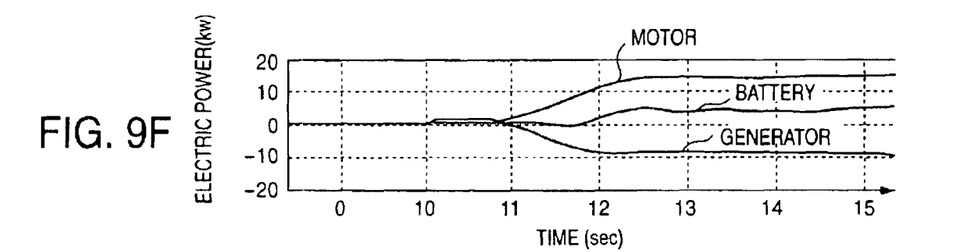

Referring to FIGS. 8A–8F, when the speed ratio variation of the planetary gear set 14 is set to be quick when the vehicle is accelerating from a stationary position, battery power from the power storage device 6 is firstly supplied to the generator/motor 2. As shown in FIG. 8A, the engine 1 and the generator/motor 2 increase the rotation speed with high response characteristics. However since the power supply to the electric motor 3 is reduced to that degree, there is a slight time lag until the output torque of the electric motor 3 as shown in FIG. 8B starts to increase. As a result, the timing at which the acceleration of the vehicle begins to increase as shown in FIG. 8E also becomes retarded. When the generator/motor 2 with an increased rotation speed begins power generation operations, the drive force of the vehicle as shown in FIG. 8C increases.

Referring to FIGS. 9A–9F, when the power supply to the generator/motor 2 is not performed, the generator/motor 2 requires time for the rotation speed of the generator/motor 2 and the engine 1 to increase due to the fact that an increase in the rotation speed depends only on the increase in the output torque of the engine 1. As a result, time is necessary for the generated power of the generator/motor 2 to meet the requirements of the electric motor 3 and preferred acceleration characteristics are not obtained.

Figure 7A:
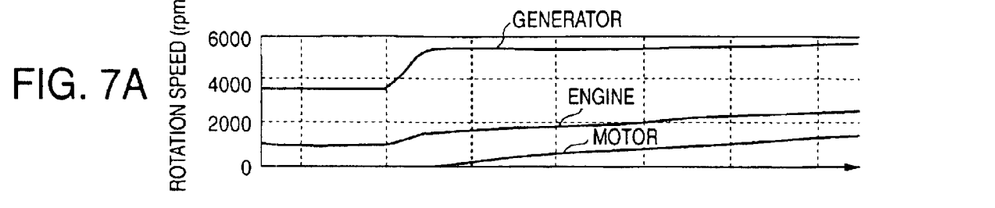
FIGS. 7A–7F are timing charts showing the acceleration performance obtained by the control according to the second embodiment of this invention.
Figure 7B:
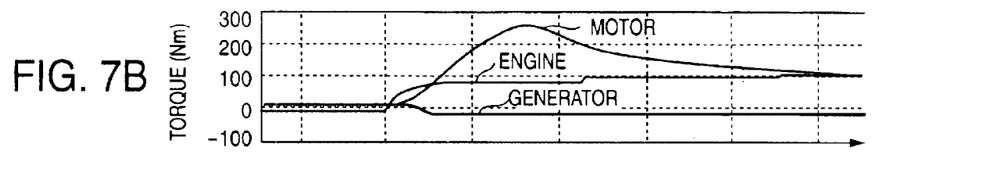
Figure 7C:
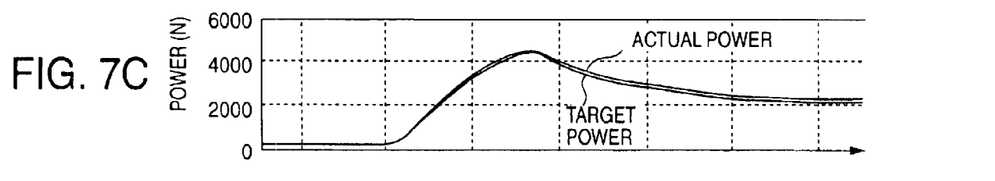
Figure 7D:
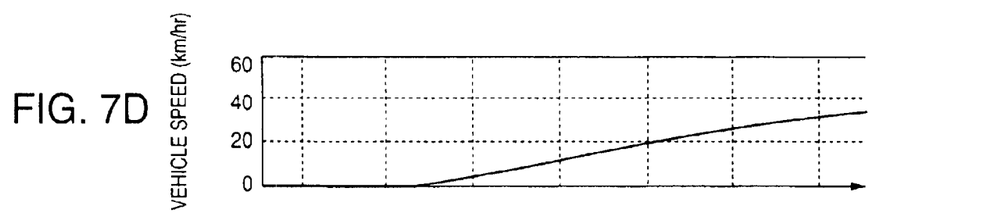
Figure 7E:
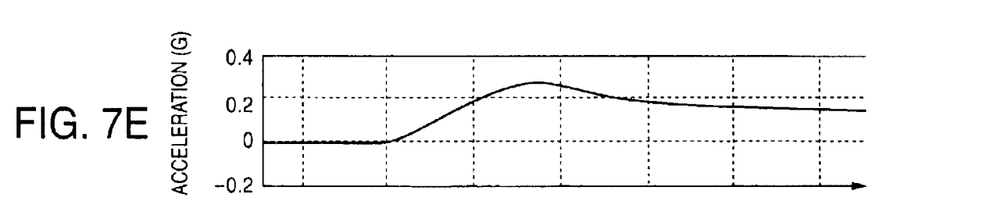
Figure 7F:
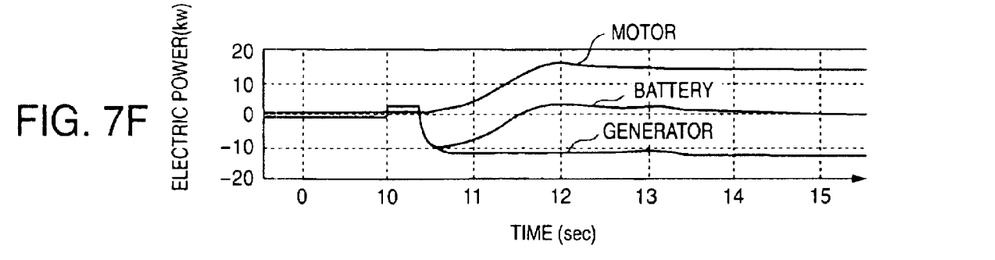

Referring to FIGS. 7A–7F, firstly with respect to the depression of the accelerator pedal 12, the control routine shown in FIG. 4 preferentially ensures power supply to the electric motor 3 and excess power is supplied to the generator/motor 2. Thus output torque of the electric motor 3 increases with high response characteristics as shown in FIG. 7B and the rotation speed of the engine 1 and the generator/motor 2 increases quickly. As a result, the drive force and the acceleration of the vehicle start to increase quickly and do not display a time lag.

Furthermore the rotation speed of the generator/motor 2 reaches the speed required to satisfy the required power generation amount in a short time.

Thus in comparison with the characteristics shown in FIGS. 8A–8F, the timing at which peak vehicle drive force is achieved is advanced, the drive force relative to the depression of the accelerator pedal increases with high response characteristics and acceleration response characteristics are improved.

The contents of Tokugan 2003-116717 with a filing date of Apr. 22, 2003 in Japan, are hereby incorporated by reference.

Although the invention has been described above by reference to certain embodiments of the invention, the invention is not limited to the embodiments described above. Modifications and variations of the embodiments described above will occur to those skilled in the art, within the scope of the claims.

For example, in each of the embodiments above, both the generator/motor 2 and electric motor 3 are constituted by an alternating-current electrically rotating machine controlled respectively through inverters 8 and 10. However this invention may be applied to a hybrid electric vehicle provided with direct-current electrically rotating machines. In that case, instead of the inverters 8, 10, control of the generator/motor 2 and the electric motor 3 may be performed using DC/DC converters.

The embodiments of this invention in which an exclusive property or privilege is claimed are defined as follows:

1. A hybrid electric vehicle comprising:
   an accelerator pedal;
   an engine consuming fuel in order to output a rotating torque;
   a first motor connected to the engine, the first motor generating electric power in response to the rotating torque of the engine while generating a rotating torque to accelerate the engine in response to power supply;
   a second motor generating a drive torque for the vehicle in response to power supply;
   a power storage device connected electrically with the first motor and the second motor, the power storage device supplying power to the first motor and the second motor while accumulating power generated by the first motor;
   a sensor detecting a depression amount of the accelerator pedal;
   a sensor detecting a rotation speed of the engine; and
   a programmable controller programmed to:
   set a target drive torque for the vehicle in response to the depression amount of the accelerator pedal;
   supply power corresponding to the target drive torque to the second motor from the power storage device;
   calculate an available power supply amount to the first motor by subtracting a power supply amount to the second motor from an available output power of the power storage device;
   calculate a target rotation speed of the engine based on the target drive torque; and
   supply power to the first motor from the power storage device within a range which does not exceed the available power supply amount to the first motor, when the available power supply amount to the first motor is a positive value and the target rotation speed of the engine exceeds the rotation speed of the engine.

2. The hybrid electric vehicle as defined in claim 1, wherein the controller is further programmed to calculate a target output torque of the second motor based on the target drive torque, and to control the operation of the second motor so that an electric power corresponding to the target output torque is consumed.

3. The hybrid electric vehicle as defined in claim 1, wherein the hybrid vehicle further comprises a sensor which detects a vehicle speed, and the controller is further programmed to calculate a target drive force for the vehicle from the target drive torque and the vehicle speed, and to control a power generation amount of the first motor in response to a difference between an electric power corresponding to the target drive force and the available output power of the power storage device when the power corresponding to the target drive force exceeds the available output power of the power storage device.

4. The hybrid electric vehicle as defined in claim 3, wherein the controller is further programmed to calculate a provisional power generation amount of the first motor from the electric power corresponding to the target drive force, and to control the power generation amount of the first motor according to whichever larger between a difference of the electric power corresponding to the target drive force and the available power of the power storage device, and the provisional power generation amount.

5. The hybrid electric vehicle as defined in claim 1, wherein the controller is further programmed to limit an upper limit of a variation rate of the target drive force.

6. The hybrid electric vehicle as defined in claim 1, wherein the hybrid electric vehicle is a parallel hybrid electric vehicle in which an output shaft of the engine, a first motor and a second motor are mechanically connected with each other through a differential gear mechanism.

7. The hybrid electric vehicle as defined in claim 6, wherein the differential gear mechanism comprises a planetary gear set having a sun gear connected to the first motor, a ring gear connected to the second motor and a carrier connected to the output shaft of the engine.

8. The hybrid electric vehicle as defined in claim 7, wherein the controller is further programmed to calculate a vehicle drive torque output from the engine via the planetary gear set, to calculate a target supply power to the second motor based on a torque obtained by deducting the vehicle drive torque output from the engine from the target drive torque for the vehicle, and to control a power generation amount of the first motor in response to a difference between the target supply power to the second motor and the available output power of the power storage device when the target supply power to the second motor exceeds the available output power of the power storage device.

9. A hybrid electric vehicle comprising:

an accelerator pedal;

an engine consuming fuel in order to output a rotating torque;

a first motor connected to the engine, the first motor generating electric power in response to the rotating torque of the engine while generating a rotating torque to accelerate the engine in response to power supply;

a second motor generating a drive torque for the vehicle in response to power supply;

a power storage device connected electrically with the first motor and the second motor, the power storage device supplying power to the first motor and the second motor while accumulating power generated by the first motor;

means for determining a depression amount of the accelerator pedal;

means for determining a rotation speed of the engine;

means for setting a target drive torque for the vehicle in response to the depression amount of the accelerator pedal;

means for supplying power corresponding to the target drive torque to the second motor from the power storage device;

means for calculating an available power supply amount to the first motor by subtracting a power supply amount to the second motor from an available output power of the power storage device;

means for calculating a target rotation speed of the engine based on the target drive torque; and means for supplying power to the first motor from the power storage device within a range which does not exceed the available power supply amount to the first motor, when the available power supply amount to the first motor is a positive value and the target rotation speed of the engine exceeds the rotation speed of the engine.

10. A control method for a hybrid electric vehicle, the hybrid electric vehicle comprising an accelerator pedal, an engine consuming fuel in order to output a rotating torque, a first motor connected to the engine, the first motor generating electric power in response to the rotating torque of the engine while generating a rotating torque to accelerate the engine in response to power supply, a second motor generating a drive torque for the vehicle in response to power supply, and a power storage device connected electrically with the first motor and the second motor, the power storage device supplying power to the first motor and the second motor while accumulating power generated by the first motor, the method comprising:

determining a depression amount of the accelerator pedal;

determining a rotation speed of the engine;

setting a target drive torque for the vehicle in response to the depression amount of the accelerator pedal;

supplying power corresponding to the target drive torque to the second motor from the power storage device;

calculating an available power supply amount to the first motor by subtracting a power supply amount to the second motor from an available output power of the power storage device;

calculating a target rotation speed of the engine based on the target drive torque; and supplying power to the first motor from the power storage device within a range which does not exceed the available power supply amount to the first motor, when the available power supply amount to the first motor is a positive value and the target rotation speed of the engine exceeds the rotation speed of the engine.

* * * * *